United States Patent

[11] 3,599,668

| [72] | Inventor | Roland P. Ricardi<br>Natick, Mass. |
|---|---|---|
| [21] | Appl. No. | 832,302 |
| [22] | Filed | June 11, 1969 |
| [45] | Patented | Aug. 17, 1971 |
| [73] | Assignee | Spectra Analyzer Corporation<br>Holliston, Mass. |

[54] LIQUID BLENDING APPARATUS
13 Claims, 5 Drawing Figs.

[52] U.S. Cl. .................................................. 137/567,
137/606, 417/282
[51] Int. Cl. .................................................. F04d 13/14
[50] Field of Search .......................................... 137/561,
565, 567, 606; 251/205, 206, 324; 73/229, 230;
417/282, 300

[56] References Cited
UNITED STATES PATENTS

| 3,051,432 | 8/1962 | Sullivan ...................... | 137/565 X |
| 3,468,335 | 9/1969 | Skoli et al. ................... | 137/565 X |

Primary Examiner—William R. Cline
Attorney—Rich & Ericson

ABSTRACT: A liquid blender for mixing two fluid streams to form a stream of predetermined composition in which mixing is accomplished by feeding the streams at substantially constant pressure through a mixing valve in which flow control is achieved by uncovering a predetermined number of ports each representing a small portion of the total flow.

INVENTOR.
ROLAND P. RICARDI

INVENTOR.
ROLAND P. RICARDI

BY

ATTORNEYS

LIQUID BLENDING APPARATUS

My invention relates to blending apparatus, and particularly to a novel blending system for accurately mixing two fluid streams to predetermined proportions.

Many manufacturing operations require the continuous blending of two or more fluids to form blends of fixed concentration. A particular example, involving most of the problems that are encountered in fluid blending, is the bottling and canning industry. There, the object is to mix two or more fluids to form a desired product and supply it as a uniform homogeneous mixture of constant proportions to a bottling or canning station. As another example, the manufacture of various deodorants and shave lotions involves the mixture of concentrates with alcohol, or alcohol and water solutions. In the manufacture of carbonated or uncarbonated beverages, syrups or fruit juices are mixed with water to form the desired product.

The manufacture of beverages by the mixture of syrups with water necessitates very close control of the ratio of water to syrup, a matter that is considerably complicated by the variations of viscosity of the syrup that occur as the temperature of the system fluctuates. Also, it may be desired to use the same apparatus at different times to make products from syrups that exhibit different viscosities at the same temperature. Frequently, it would be desirable to make production runs of conventional beverages using highly viscous syrups interspersed with runs of dietetic beverages using syrups with low viscosity.

Numerous systems have been developed for blending fluids, but, so far as I am aware, prior to my invention there has been no completely satisfactory solution of the various problems presented. One approach is the use of two positive displacement meters geared together to secure a constant ratio of two fluids to be blended. That method will produce two streams with a predetermined ratio flow rates at constant temperature, but is quite sensitive to changes in viscosity. Also, it is not a simple matter to change the ratio, once established, because that requires changing the gears between the meters. And, when a constant ratio is secured, there still remains the problem of blending the two streams to a homogeneous mixture.

A second approach involves the use of a constant head, gravity feed system for both fluids to be blended. The fluids are admitted to a common chamber through orifices of selected sizes. That system is also sensitive to changes of viscosity, and requires a change in orifice plates to change the fluid ratio. Establishment of the exact ratio is a matter of on-stream calibration. Moreover, the gravity head system tends to absorb air, which is highly undesirable in the manufacture of canned beverages. In such beverages, oxidation of the can reduces shelf life.

In another available system, a calibrated valve is used in the water line, and a calibrated magnetic turbine meter is installed in the syrup line. The turbine meter produces a control signal that can be used to adjust a valve in the syrup line, thereby establishing a blend ratio against the known flow rate through the water valve. That system is relatively difficult to manipulate, and requires a skilled operator. Moreover, any changes in the viscosity of the syrup would require recalibration.

Another method of establishing a flow rate ratio is to use positive displacement pumps, the pump stroke being adjusted to change the amount of fluid delivered. With such pumps, an accurate flow ratio can be produced by proper calibration, but changes are relatively difficult and require recalibration, and the blending problem is not solved.

Another system includes conventional valves, which are set manually to the approximate ratio desired, and then continuously trimmed with the signal from a refractometer mounted in the blender product line. However, the reliability of the refractometer for continuous operation is poor and further, the accuracy of the measurement for dietetic products is unsatisfactory.

The objects of my invention are to facilitate the blending of liquids to selected proportions, to make it easier to change the proportions of such blends, and to make blending apparatus less susceptible to variations caused by temperature changes and consequent changes of viscosity.

Briefly, the above and other objects of my invention are attained by a novel blending system in which a centrifugal pump is installed in the supply line for each of the fluids to be blended. The pumps are selected to have a relatively flat pressure response curve in the desired flow region. Thus, the liquids to be blended are brought into the system at a substantially constant pressure that is relatively insensitive to flow rate over a useful range.

One of the liquids is admitted to a flow control valve comprising a piston in a sleeve. The sleeve is pierced with a first set of normally open orifices, through which a majority of the desired flow rate occurs, land a series of metering orifices that can be opened or closed by the piston. Each metering orifice admits a desired constant proportion of the total flow.

The fluid so metered is then admitted to a mixing valve, in which a second fluid is added through a second sleeve and piston arrangement similar to that comprising the first valve. However, the location of the metering orifices in the second valve is selected, in a manner to appear, such that highly effective mixing takes place in the valve and immediately downstream thereof. The sizing of the orifices in the two valves, or in any additional metering valves that may be provided to introduce additional fluids for blending, is not critical if the fluids to be metered through the valve is not subject to temperature changes, or if it does not exhibit an appreciable change of viscosity or density with temperature, as in the instance of water. However, for fluids that are highly susceptible to temperature, such as syrups, the orifices are specifically proportioned, in a manner to be described in detail below, so that viscosity and density compensation is attained.

The manner in which the apparatus of my invention is constructed, and its mode of operation, will best be understood in the light of the following detailed description, together with the accompanying drawings, of a preferred embodiment thereof. In the drawings.

Figure 1:
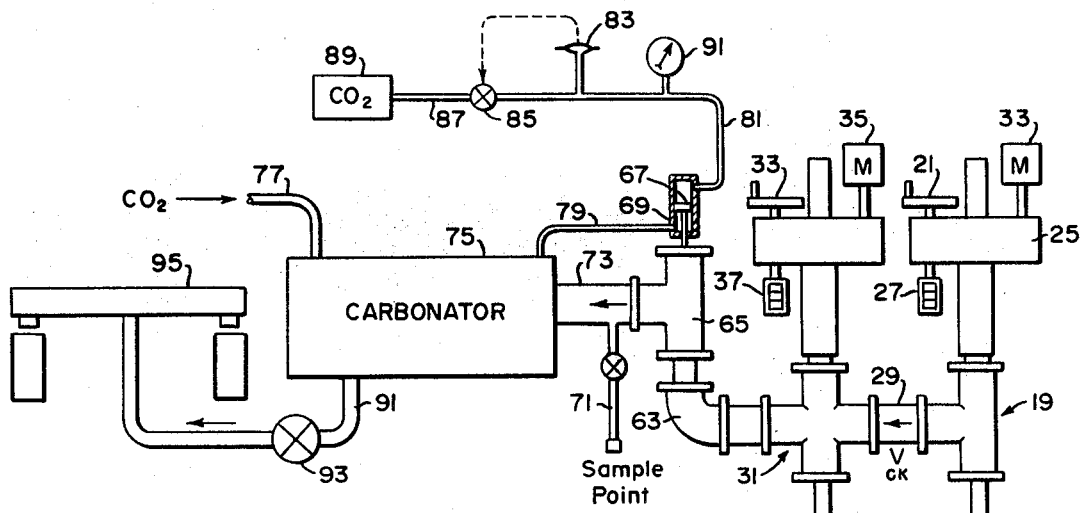
FIG. 1 is a schematic diagram of a packaging system in accordance with my invention.
Figure 1:
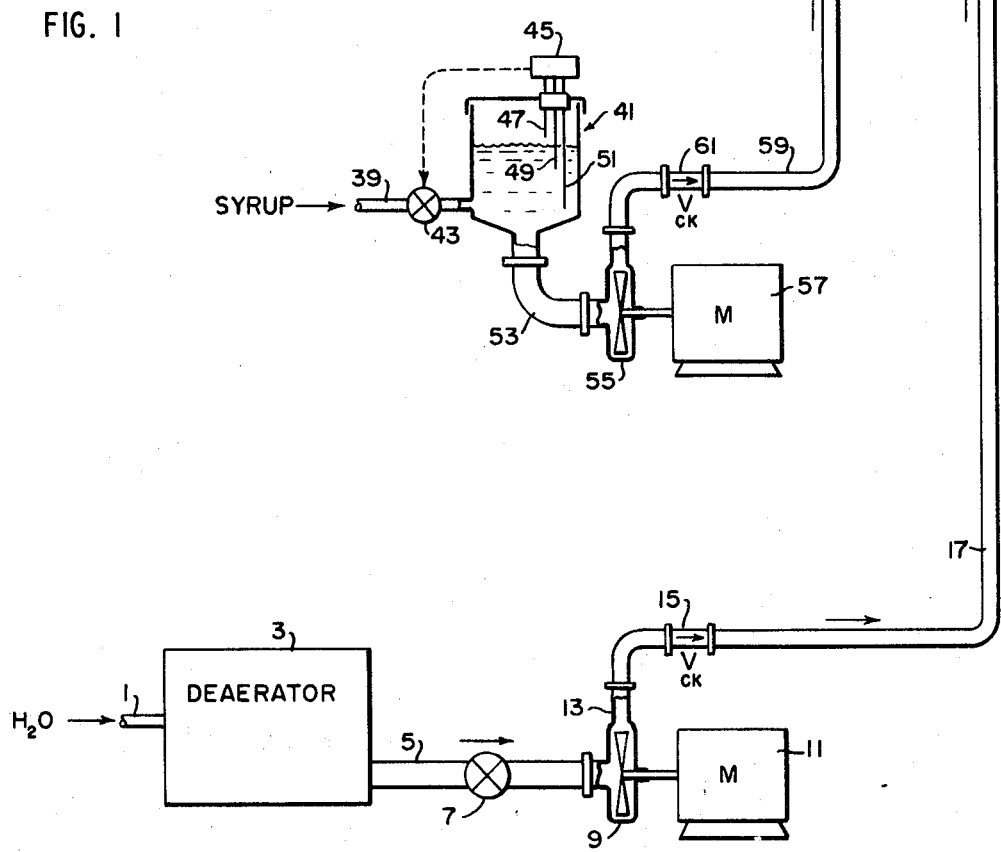

Referring to FIG. 1, I have shown a packaging system for bottling or canning carbonated beverages. The system is supplied with water by a conventional supply line 1. The water in line 1 flows to a conventional deaerator 3 in which air or other gases dissolved in it are removed, such gases being deleterious to the storage life of packaged beverages. Water from the deaerator 3 flows through a line 5 under the control of a valve 7 of any conventional construction, and thence to the inlet side of a conventional centrifugal pump 9.

The pump 9 is driven by a motor 11, such as a conventional electric motor or the like. The pump 9 is selected to have a relatively flat head characteristic over a fairly wide flow range, such as from 20 gallons per minute to 120 gallons per minute. Thus, pressure at the outlet side 13 of the pump 9 will be essentially constant over the useful flow range. The actual pressure is typically chosen in the range from 50 to 100 pounds per square inch, as may be convenient in a particular application.

Water from the pump 9 flows through a check valve 15 and a suitable line 17 to a flow control valve generally designated 19, to be described in more detail below. The valve 19 is arranged to be adjusted either by a hand wheel 21 or by an electric motor 23 through a differential gear housed in housing 25. Preferably, a digital indicator 27 is provided to indicate the exact setting of the valve 19.

The water metered by the valve 19 flows through a check valve 29 to a mixing valve 31, to be described in more detail below. As in the case of the flow control valve 19, the valve 31 is arranged to be adjusted either by a hand wheel 33 or by an electric motor 35, and is preferably provided with a digital indicator 37 to register its adjusted position.

Syrup, or any conventional composition used for the preparation of carbonated beverages, is supplied through a line 39. Basically, such a syrup usually comprises a flavored solution of sugar and water. From the line 39, the syrup is admitted to a reservoir 41, which may be an open reservoir, under the control of a valve 43. The valve 43 is controlled by a level probe sensing system of any conventional variety, indicated schematically at 45, preferably provided with three level sensing probes 47, 49 and 51. These probes serve to provide signals in a conventional manner to cause the valve 43 to be completely closed when the level falls below the probe 51.

Syrup from the reservoir 41 is supplied through a line 53 to the inlet side of a conventional centrifugal pump 55. The pump 55 is driven by a conventional motor 57. As in the case of the pump 9, the pump 55 is selected to exhibit a substantially constant head over its desired range of flow rates, and is arranged to produce a relatively constant output pressure in the output line 59 that is in a relationship to the pressure in the line 17 that depends on the viscosity and density of the fluid in a manner to appear. Preferably, a check valve 61 is included in the line 59.

As will appear, thorough mixing of the syrup and water takes place in the valve 31. The mixture emerging from the valve 31 is supplied through a line 63 to a flow control valve 65, to be described in more detail below. The valve 65 is controlled by a piston 67 in a cylinder 69, in a manner to appear.

Preferably, a sample tap line 71 is installed in the line 73 downstream of the valve 65. I have found the blend to be so homogeneously mixed at this point that a sample can be taken that accurately represents the composition of the final product.

The blend of syrup and water in the line 73 is supplied to a conventional carbonator 75 of any conventional construction. The carbonator 75 is supplied with carbon dioxide through a line 77. Gas pressure in the carbonator 75 is supplied to the lower side of the piston 67 through a line 79 connected to the cylinder 69. A line 81 is connected to the top of the cylinder 69 to supply a reference pressure to the upper side of the piston 67. This reference pressure is produced in a conventional manner by a pressure sensing diaphragm actuator 83 controlling a valve 85 in a line 87 connected to a suitable source 89 of carbon dioxide under pressure. The set pressure is registered by a conventional pressure gauge 91.

Carbonated beverage from the carbonator 75 is supplied through a line 91, in which a valve 93 of conventional construction is installed, to admit carbonated beverage to a conventional canning or bottling head 95, which operates in a manner that will be familiar to those skilled in the art to fill containers with carbonated beverage and then seal them and move the sealed containers out for storage and shipment.

All of the parts and fittings so far described which are subject to contact with the syrup or the blended syrup and water are preferably made of conventional sanitary materials, such as stainless steel or the like, using sanitary construction so that the parts can be easily disassembled and cleaned when desired.

The operation of the apparatus shown in FIG. 1 will be generally apparent from the above description. Briefly, however, assuming that the pumps 9 and 55 are in operation and that the valves 19 and 31 have been appropriately set, a prescribed ratio of syrup and water mixture is supplied to the valve 65. The valve 65 serves as a back pressure regulator, and also as an in-line blender, in that turbulence introduced at the valve will contribute to mixing. The basic purposes of the valve 65, however, is to control the back pressure to provide constant flow.

Should the pressure in the line 79 increase, the piston 67 will rise, adjusting the valve 65 to a more open position. The combination of a higher downstream pressure in the carbonator 75 and the more open position of the valve 65 cause the total flow rate to remain constant. Moreover, since the pressures in the syrup line 59 and the water line 17 are constant, the ratio of water to syrup will remain constant. However, back pressure fluctuations in the carbonator do not effect the ratio since the change in pressure in water line 17 and syrup line 59 will be the same.

Figure 2:
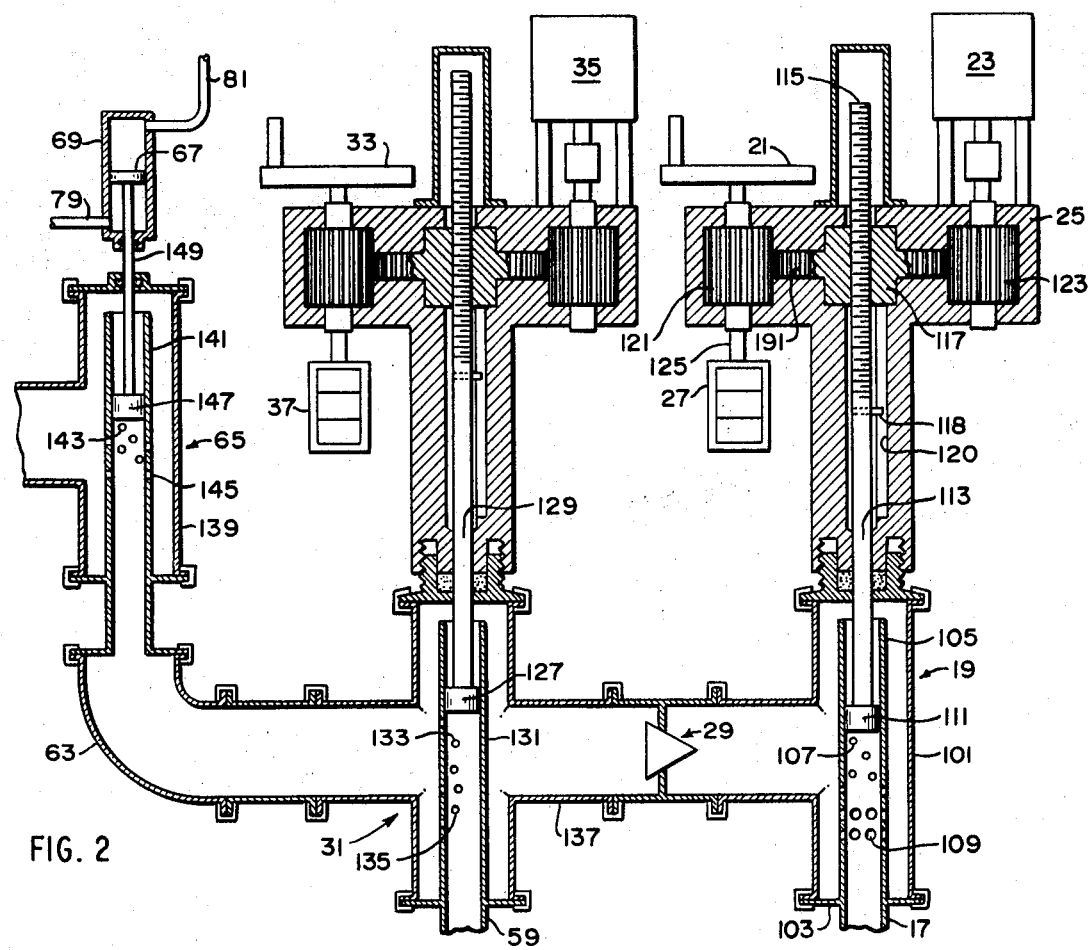
FIG. 2 is a detailed elevational view of a portion of the apparatus of FIG. 1, on an enlarged scale, with parts shown in cross section and parts broken away.

FIG. 2 shows the details of the values 19, 31 and 65, and their controls, in more detail. As shown, the valve 19 basically comprises a tee 101 connected through a sealing flange 103 to the water inlet pipe 17. An extension 105 of the pipe 17 comprises a sleeve that is pierced with a first series of apertures 107 and a second series of larger apertures 109. Assuming that the pipe 105 is about 1 inch I.D. and that the tee is 1 and ½ to 2 inches I.D., the holes 107 may be one-eighth of an inch in diameter, and the holes 109 may be one-quarter of an inch in diameter. Those sizes are merely exemplary, and may be varied in dependence on convenience and the accuracy of flow control desired.

Slideable in the sleeve 105 is a piston 111 that is preferably of Teflon (polytetraflouroethylene) or other sanitary material having suitable properties of low friction, sealing and wearing. Connected to the piston 111 is a stainless steel shaft 113 that is threaded at its upper end as indicated at 115. As schematically indicated, threads 115 formed on the shaft 113 are adapted to mate with cooperating treads formed on a drive nut 117.

The nut 117 is formed integral with a drive gear 191 that engages a pair of drive gears 121 and 123. The gear 121 is arranged to be operated manually by the hand wheel 21, and the gear 123 is arranged to be operated by an electric motor 23.

A shaft 125 connected to the gear 121 is adapted to drive a conventional digital indicator 27 to indicate the position of the shaft 113 to three significant figures. A key 118 connected to the shaft 113 is adapted to slide in a keyway 120 formed in the housing 25 to restrain the shaft against rotation. By that arrangement, it will be apparent that when the motor 23 is energized, the shaft 125 will both be rotated, and the shaft 113 will be reciprocated, with the handwheel 21 following, and that when the handwheel 21 is operated, the same thing will happen with the armature of the motor 23 following. By either mode of operation, the position of the piston 111 in the sleeve 105 can be adjusted to uncover a desired number of the holes 107.

Figure 5:
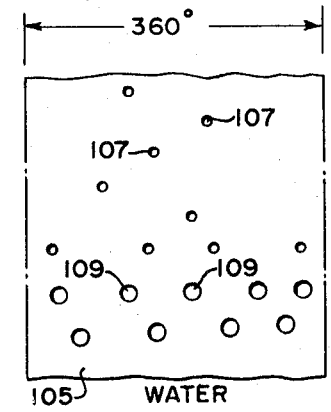
FIG. 5 is a schematic development of a portion of a third valve forming a part of the apparatus of FIGS. 1 and 2.

As best shown in FIG. 5, the holes 107 are distributed about the periphery of the sleeve 105 in a manner that provides maximum spacing between the adjacent holes and which allows the holes 107 to be closed one at a time as the piston 111 moves down in FIG. 2, and to be opened one at a time as the piston is moved up. The larger holes 109 may be closed by the piston 111 if desired for installation or service purposes but in normal operation, will not be closed by the piston 111.

The proportion of flow through the normally open holes 109 is preferably from 80 to 90 per cent of the total flow through the valve when all of the ports 107 are open. Conveniently, each port 107 may be arranged to make a 1 per cent change in the flow rate. If desired, even finer control can be provided.

There are a number of reasons for providing normally open holes 109 to allow most of the flow. One is that it is ordinarily quite unnecessary to meter flow precisely over the full possible range from open valve to closed valve. Another is that with the balance of the flow going through the holes 109, each metering hole orifice 107 controls a smaller percentage of the flow and thus permits finer control. Finally, in the case of a water valve, the normally open holes can be larger, thus requiring fewer of them. As will appear, for the control of flow of a fluid which is subject to variations in density and viscosity with temperature, it would be desirable that the holes 107 and 109 be of the same size. However, in the embodiment shown they are adapted to adjust the flow rate of water, which is relatively insensitive to temperature, as far as viscosity and density are concerned, over the usual range of operating temperatures that would be encountered.

The valve 31 is provided with a Teflon piston 127 controlled by a shaft 129 in a construction that may be identical with that for the shaft 113, described above. Accordingly, that control will not be described in further detail.

Figure 4:
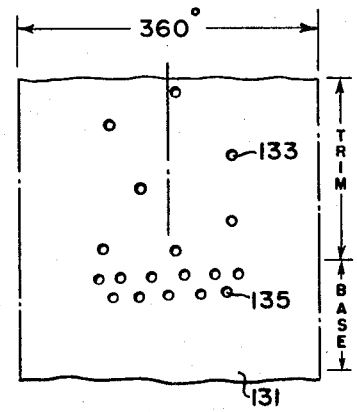
FIG. 4 is a schematic development of a portion of another valve forming a portion of the apparatus of FIGS. 1 and 2.

The sleeve 131 forming a portion of the valve 31 is of the same construction as the sleeve 105, except that the orifices provided in it are differently sized and arranged. Referring to FIGS. 2 and 4, the sleeve 131 is provided with metering orifices 133 and base flow orifices 135 that are all of the same size and are grouped within 180° of the periphery of the sleeve 131 in the downstream direction. The purpose of this grouping is to cause better mixing at the valve.

As in the case of the water valve, the base ports 135 permit from 80 to 90 per cent of the total flow through the valve, and the metering orifices 133 control from 10 to 20 per cent of the flow. The orifices 133 and 135 are preferably of the same size. The selection of the size of these orifices is critical, because with the proper size, changes in density and viscosity of the syrup, either because a different syrup is used or because the same syrup is used at different temperatures, can be compensated for by properly sizing these orifices.

It will be apparent that because the piston 127 normally only ranges over the metering orifices 133, and thus controls a small percentage of the flow, the pressure drop across the valve 31, from the line 59 to the line 63, will be essentially constant. Assuming that it is about 30 pounds per square inch, that the sleeve 131 is nominally 1 inch, and that the body 137 of the valve 131 is approximately 2 inches, I have found that if the holes 133 and 135 are 0.070 inches in diameter, insufficient compensation for viscosity and density will be provided. On the other hand, with holes on the order of 0.050 inches in diameter, overcompensation will occur. If the holes are 0.060 inches in diameter, approximately optimum compensation is attained.

While I do not wish to be bound by the details of any specific theory that would explain the compensation for viscosity and density produced by valves such as 31 with the proper sized orifices, it is thought that the effect is produced by a relationship between the centrifugal pump, such as 55 in FIG. 1, and the size of the orifices 133 in the valve 31, FIG. 2. As noted above, the output pressure produced by the centrifugal pump 55 is relatively unaffected by flow rate over a fairly wide range. However, the output pressure is affected by viscosity and density, in that an increase in viscosity and/or density will produce an increase in output pressure of the pump at the same pump speed. If the holes such as 133 and 135 in FIG. 2 were large enough, that increase in pressure would result in a corresponding increase in flow rate through the valve. On the other hand, should the holes 133 and 135 be small enough, the increase in pressure at the outlet side of the pump 55 would not be enough to cause an increased flow through the valve, and the flow would in fact decrease, because the increased viscosity or density of the fluid would become the important factor limiting the flow through the valve ports. There is thus an intermediate range of orifice sizes in which, as the output pressure of the pump changes as the viscosity or density, or both, change, the flow rate through the orifice at a given pressure drop also changes, in an opposing way so that the effects of density and viscosity are compensated for. The result is that the blending ratio established by the valve is relatively independent of viscosity and density over a useful range.

Referring again to FIG. 2, the construction of the valve 65 is similar to the valves 31 and 19 in that it includes an outer body 139, and inside that a sleeve 141. The sleeve 141 is provided with a series of metering orifices 143 and a series of base flow orifices 145 that are normally open. As the blended beverage is somewhat sensitive to viscosity and density changes, although it is usually predominantly water and is relatively insensitive, it is preferred that the holes 143 and 145 be of the same size and that they be appropriately sized to compensate for viscosity and density. Thus, preferably holes of about 0.060 inches diameter are employed.

Figure 3:
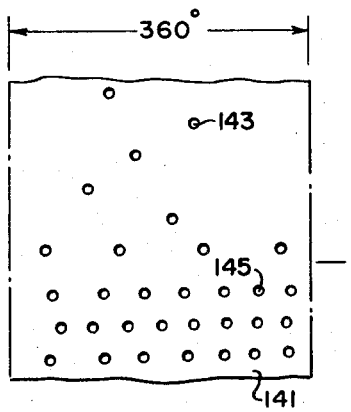
FIG. 3 is a fragmentary schematic development of a portion of a valve forming part of the apparatus of FIGS. 1 and 2.

A Teflon piston 147 in the sleeve 141 is employed to control the number of metering orifices 143 that are open. As shown, the piston 147 is connected by a stem 149 to the pressure responsive piston 67 in the cylinder 69, operating as described above. The orifices 143 and 145 in the valve sleeve 141 may be distributed about the periphery of the sleeve 141 as indicated in FIG. 3, because the concentration of the fluid outside the sleeve is essentially that inside the sleeve. However, turbulence introduced by flow of fluid through the orifices 143 and 145 contributes additional mixing to the blend.

The desired ratio of water to syrup encountered in normal practice is from about 4 to 1 to about 7 to 1. It can be shown that if $Q_{b1}$ and $Q_{b2}$ are the flows through the valves 19 and 31, respectively, with all metering ports closed, $\Delta Q_{b1}$ and $\Delta Q_{b2}$ are the flows through the metering ports in the valves 19 and 31, respectively, with all metering ports open, $$\frac{R \max}{R \min} = (1+X)^2$$

and Rmax and Rmin are the maximum and minimum blending ratios, respectively, then $$\frac{\Delta Q_{b1}}{Q_{b1}} = \frac{\Delta Q_{b2}}{Q_{b2}} = X$$

That relation implies either that the metering ports control more than 80 percent of the flow through the associated valve, or that the sleeves such as 105 and 131 be changed, if the full range of 4:1 to 7:1 is to be covered. In practice, I prefer to arrange the metering ports so that, for each valve, control of 10 per cent of the total flow is available, and to provide different valve sleeves to cover a large range. Though not shown in detail in the drawings, it will be apparent to those skilled in the art how the valve parts are divided and connected together to facilitate assembly and disassembly. Such accessibility to the parts is required in any event for cleaning purposes, and is conventionally provided in any sanitary system.

While I have described my invention with respect to the details of a preferred embodiment thereof, many changes and variations will occur to those skilled in the art upon reading my description, and such can obviously be made without departing from the scope of my invention.

Having thus described my invention, what I claim is:

1. In combination with a centrifugal fluid pump having an output pressure characteristic that is relatively insensitive to flow rate over a predetermined range of flow rates and that is relatively sensitive to the viscosity and density of fluid admitted to the pump, a valve comprising a series of orifices, means for sequentially opening and closing said orifices, and a fluid conduit connecting the output side of said pump to said valve, in which the size of said orifices is selected in dependence on the functional relationship between pump output pressure and the viscosity and density of the pumped fluid to cause the flow through each orifice to be independent of fluid viscosity and density over a predetermined range.

2. A blender, comprising:
first and second centrifugal pumps each having a relatively flat characteristic of head versus flow rate over a predetermined range,
means for supplying a first fluid to said first pump,
means for supplying a second fluid to said second pump,
a metering valve connected to the output side of said first pump,
a mixing valve connected to the output said of said second pump, and
conduit means connecting said metering valve to said mixing valve, wherein said mixing valve comprises a partition between said second pump and said conduit means,
means forming a series of orifices in said partition, and
closing means movably mounted adjacent said partition for movement over a range of positions in each of which a different number of said orifices is closed, and in which the size of said orifices is that function of the output characteristic of said second pump which compensates for variations in pump pressure caused by variations in the properties of said second fluid by opposing variations in flow through the orifices so that a constant flow rate is obtained at any valve setting despite changes in said second fluid.

3. The blender of claim 2, further comprising:

means for adjusting the output pressures of said pumps to the same value, and pressure control means at the output side of said mixing valve for maintaining a constant pressure downstream of the mixing valve.

4. A flowmeter for establishing a constant flow rate of fluid independent of the density and viscosity of the fluid over a predetermined range, comprising:

a centrifugal pump adapted to be connected to a fluid supply, said pump having output characteristics that produce a stream of fluid at a pressure that increases with increases in fluid density or viscosity but is relatively independent of flow rate over a predetermined range, a conduit connected to said pump to receive said stream, and a partition in said conduit pierced by at least one orifice said orifice having a size determined by the aforesaid characteristics of the pump to maintain substantially constant flow over a predetermined range of fluid density and viscosity.

5. The flowmeter of said orifice is between 0.045 and 0.075 inches in effective diameter.

6. The flowmeter of claim 4, in which said partition is pierced by a plurality of said orifices, and further comprising:

means operatively connected to said partition to sequentially close and open at least a subset of said plurality of orifices to adjust the rate of flow of fluid through said pump, said conduit and said partition.

7. In a fluid blending system:

a first fluid conduit for conveying a first stream of a first fluid to be blended, a second fluid conduit for conveying a second stream of a second fluid to be blended with said first stream, a third conduit, a flow control valve connected between said first conduit and said third conduit, an output conduit, and an adjustable mixing valve connected between said third conduit, said second conduit and said output conduit to deliver a mixture of said first and second fluids to said output conduit determined by the extent of adjustment of said mixing valve, in which said flow control valve comprises a partition between said first conduit and said third conduit, means forming a set of spaced orifices in said partition, and means for sequentially closing at least some of said orifices to adjust the flow through said flow control valve in predetermined increments, and in which said mixing valve comprises means forming a passage between said third conduit and said output conduit, a second partition between said second conduit and said passage, means forming a set of orifices in said second partition, and means for sequentially closing at least some of said orifices to adjust the flow of said second fluid relative to the flow of said first fluid in predetermined increments.

8. The apparatus of claim 7, in which said second partition comprises a sleeve connected at one end to said second conduit and extending across said passage;

said orifices being located on a side of said sleeve downstream of flow from said third conduit to said output conduit, and in which said means for closing orifices in said second partition comprises a piston slideable in said sleeve.

9. The apparatus of claim 8, further comprising a first centrifugal pump connected in said first conduit, a second centrifugal pump connected in said second conduit, and means for operating said pumps to bring the fluids in said first and second conduits to a fixed pressure relationship upstream of said valves.

10. The apparatus of claim 9, further comprising:

flow control means in said output conduit for maintaining the flow through said output conduit substantially constant.

11. The apparatus of claim 7, in which:

the orifices in said second partition are each of a size that will admit a relatively constant flow of said second fluid independent of the viscosity and density of the second fluid, when said second fluid is delivered by a centrifugal pump operating in a substantially flat head region relative to flow rate.

12. The apparatus of claim 7, further comprising:

a first centrifugal pump connected in said first conduit, a second centrifugal pump connected in said second conduit, and means for operating said pumps to bring the fluids in said first and second conduits to a fixed pressure relationship upstream of said valves.

13. The apparatus of claim 12, further comprising:

a fluid accumulator connected to said output conduit, a control valve in said output conduit, and means responsive to the pressure in said accumulator for operating said control valve to maintain substantially constant flow in said output conduit.